United States Patent
Erdman et al.

(10) Patent No.: US 7,602,075 B2
(45) Date of Patent: Oct. 13, 2009

(54) SYSTEMS, METHODS AND APPARATUSES FOR A WIND TURBINE CONTROLLER

(75) Inventors: William Erdman, Moraga, CA (US); Michael Behnke, Livermore, CA (US); Ricardo Royo Garcia, Pamplona (ES); Miguel Nunez Polo, Elizondo (ES)

(73) Assignee: Acciona Windpower, S.A., Sarriguren, Navarre-Spain (ES)

( * ) Notice: Subject to any disclaimer, the term of this patent is extended or adjusted under 35 U.S.C. 154(b) by 0 days.

(21) Appl. No.: 11/773,730

(22) Filed: Jul. 5, 2007

(65) Prior Publication Data

US 2008/0030027 A1 Feb. 7, 2008

Related U.S. Application Data

(60) Provisional application No. 60/806,707, filed on Jul. 6, 2006.

(51) Int. Cl.
- *H02P 9/04* (2006.01)
- *F03D 9/00* (2006.01)
- *F02N 11/06* (2006.01)
- *H02J 1/10* (2006.01)
- *H02J 3/38* (2006.01)
- *H02J 7/34* (2006.01)
- *H02J 3/06* (2006.01)
- *H02J 3/46* (2006.01)
- *H02J 1/12* (2006.01)
- *H02J 3/14* (2006.01)

(52) U.S. Cl. .......................... 290/44; 290/40 R; 307/18; 307/19; 307/21; 307/38

(58) Field of Classification Search ................... 290/44, 290/40 R; 307/18, 19, 21, 38

See application file for complete search history.

(56) References Cited

U.S. PATENT DOCUMENTS

| | | | | | |
|---|---|---|---|---|---|
| 4,160,170 | A | * | 7/1979 | Harner et al. | 290/44 |
| 4,161,658 | A | * | 7/1979 | Patrick | 290/44 |
| 4,168,439 | A | * | 9/1979 | Palma | 290/44 |
| 4,180,367 | A | * | 12/1979 | Drees | 416/119 |
| 4,189,648 | A | * | 2/1980 | Harner | 290/44 |
| 4,280,060 | A | * | 7/1981 | Kure-Jensen et al. | 290/40 R |
| 4,297,076 | A | * | 10/1981 | Donham et al. | 416/37 |
| 4,348,155 | A | | 9/1982 | Barnes et al. | 416/46 |
| 4,348,156 | A | * | 9/1982 | Andrews | 416/48 |
| 4,352,634 | A | * | 10/1982 | Andrews | 416/154 |

(Continued)

*Primary Examiner*—Quyen Leung
*Assistant Examiner*—Pedro J Cuevas
(74) *Attorney, Agent, or Firm*—Chadbourne & Parke LLP; Walter G. Hanchuk

(57) ABSTRACT

The disclosure describes implementations of methods, systems and apparatuses that are configured to facilitate normal operating characteristics for a wind turbine during normal operation, as well as during voltage irregularities. In an implementation, a turbine controller coordinates operating primary turbine systems and ancillary turbine systems during normal operation and during voltage irregularities. During normal operation, the turbine controller coordinates powering both primary and ancillary turbine systems through a power supply. During a detected voltage event, ancillary turbine systems may be transitioned to a having an uninterruptible power supply power these systems. However, the turbine controller coordinates maintaining the power supply as the sole powering device for primary turbine systems despite a voltage irregularity. In some implementations, when the power supply reaches a critical level during a voltage irregularity, a system fault flag is generated and the turbine blades may be driven into a full feather operational position.

15 Claims, 8 Drawing Sheets

U.S. PATENT DOCUMENTS

| | | | | |
|---|---|---|---|---|
| 4,355,955 A * | 10/1982 | Kisovec | | 416/23 |
| 4,400,659 A | 8/1983 | Barron et al. | | 322/32 |
| 4,423,333 A * | 12/1983 | Rossman | | 290/44 |
| 4,462,753 A * | 7/1984 | Harner et al. | | 416/48 |
| 4,656,362 A * | 4/1987 | Harner et al. | | 290/44 |
| 4,700,081 A | 10/1987 | Kos et al. | | 290/44 |
| 4,703,189 A | 10/1987 | Divalentin et al. | | 290/44 |
| 4,792,281 A * | 12/1988 | Coleman | | 416/156 |
| 5,083,039 A | 1/1992 | Richardson et al. | | 290/44 |
| 5,155,375 A | 10/1992 | Holley | | 290/44 |
| 5,213,470 A | 5/1993 | Lundquist | | 416/9 |
| 5,289,041 A | 2/1994 | Holley | | 290/44 |
| 6,428,274 B1 | 8/2002 | Hehenberger | | 416/153 |
| 6,441,507 B1 | 8/2002 | Deering et al. | | 290/44 |
| 6,609,889 B1 | 8/2003 | Vilsboll | | 416/1 |
| 6,888,262 B2 | 5/2005 | Blakemore | | 290/44 |
| 6,921,985 B2 * | 7/2005 | Janssen et al. | | 290/44 |
| 7,004,724 B2 | 2/2006 | Pierce et al. | | 416/61 |
| 7,095,129 B2 | 8/2006 | Moroz | | 290/44 |
| 7,126,236 B2 | 10/2006 | Harbourt et al. | | 290/44 |
| 7,172,392 B2 * | 2/2007 | Wastling et al. | | 416/43 |
| 7,175,389 B2 | 2/2007 | Moroz | | 416/1 |
| 7,218,012 B1 | 5/2007 | Edenfeld | | 290/44 |
| 7,227,275 B2 * | 6/2007 | Hennessy et al. | | 290/55 |
| 7,256,509 B2 | 8/2007 | Brandt et al. | | 290/44 |
| 7,265,456 B2 * | 9/2007 | Hennessy | | 290/44 |
| 7,353,083 B2 * | 4/2008 | Hennessy | | 700/286 |
| 7,355,294 B2 * | 4/2008 | Teichmann | | 290/44 |
| 2004/0145188 A1* | 7/2004 | Janssen et al. | | 290/44 |
| 2004/0151575 A1 | 8/2004 | Pierce et al. | | 415/1 |
| 2004/0151577 A1 | 8/2004 | Pierce et al. | | 415/4.1 |
| 2004/0151584 A1 | 8/2004 | Blakemore | | 416/9 |
| 2005/0156431 A1* | 7/2005 | Hennessy | | 290/44 |
| 2005/0156432 A1* | 7/2005 | Hennessy | | 290/44 |
| 2005/0201862 A1* | 9/2005 | Wastling et al. | | 416/98 |
| 2006/0002797 A1 | 1/2006 | Moroz et al. | | 416/98 |
| 2006/0070435 A1 | 4/2006 | Lemieux et al. | | 73/168 |
| 2006/0140761 A1 | 6/2006 | Lemieux | | 416/61 |
| 2006/0171086 A1* | 8/2006 | Hennessy et al. | | 361/62 |
| 2006/0208493 A1 | 9/2006 | Harbourt et al. | | 290/44 |
| 2007/0024059 A1 | 2/2007 | D'Atre et al. | | 290/44 |
| 2007/0267873 A1* | 11/2007 | Teichmann | | 290/44 |
| 2008/0118354 A1 | 5/2008 | Jeppsen et al. | | 416/1 |
| 2008/0206051 A1* | 8/2008 | Wakasa et al. | | 416/41 |
| 2008/0277938 A1* | 11/2008 | Oohara et al. | | 290/44 |
| 2009/0058086 A1* | 3/2009 | Arinaga et al. | | 290/44 |

* cited by examiner

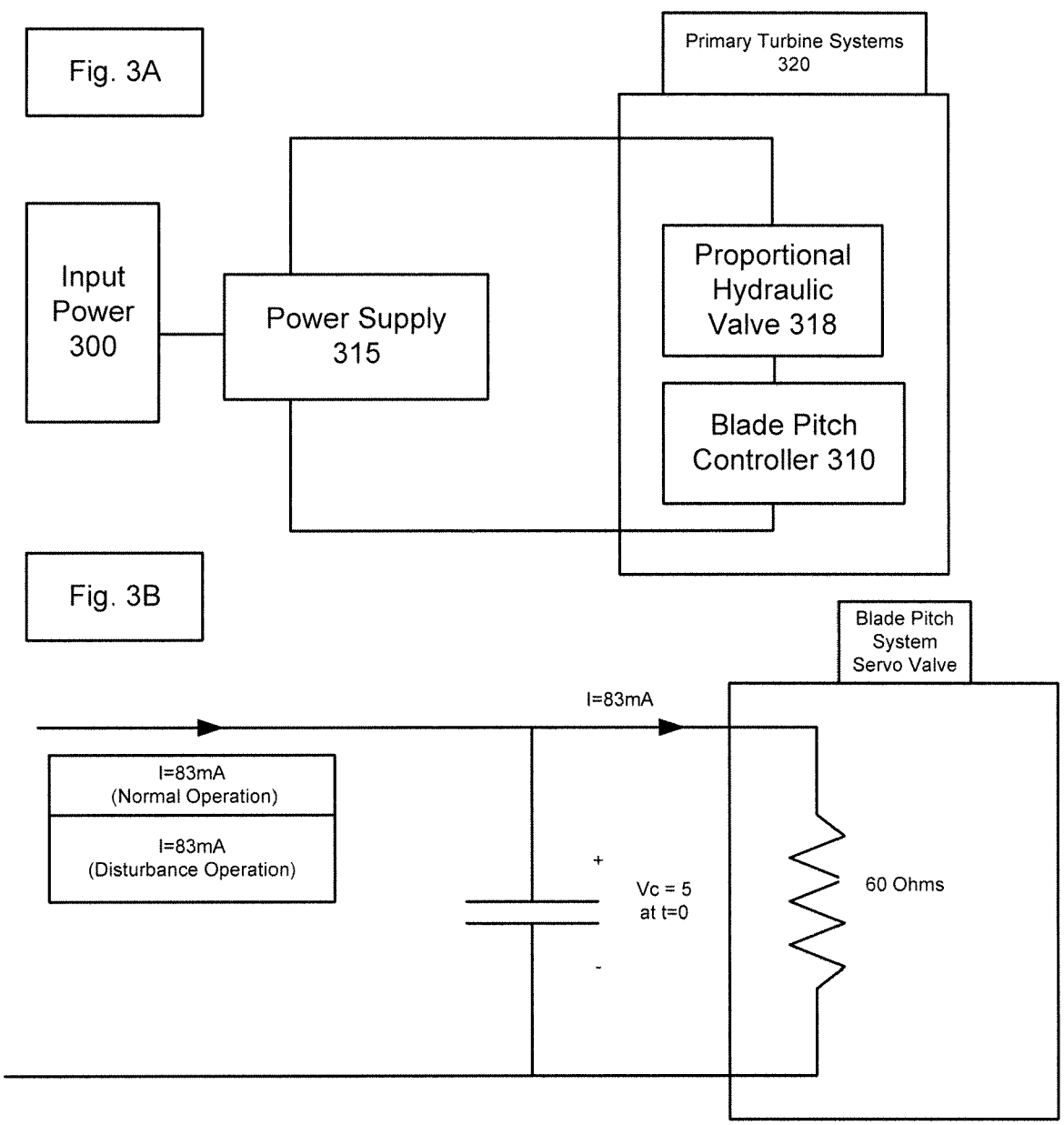

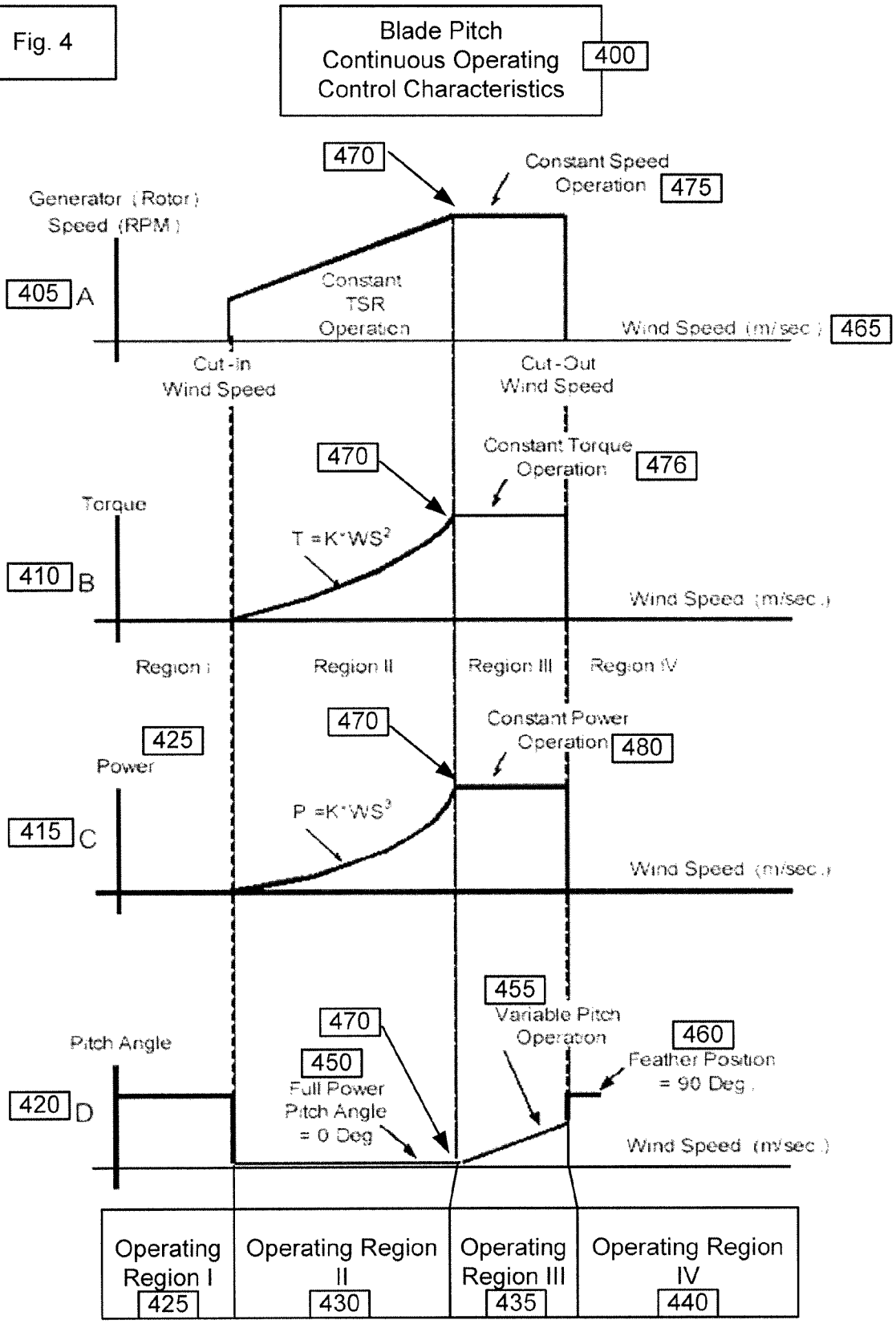

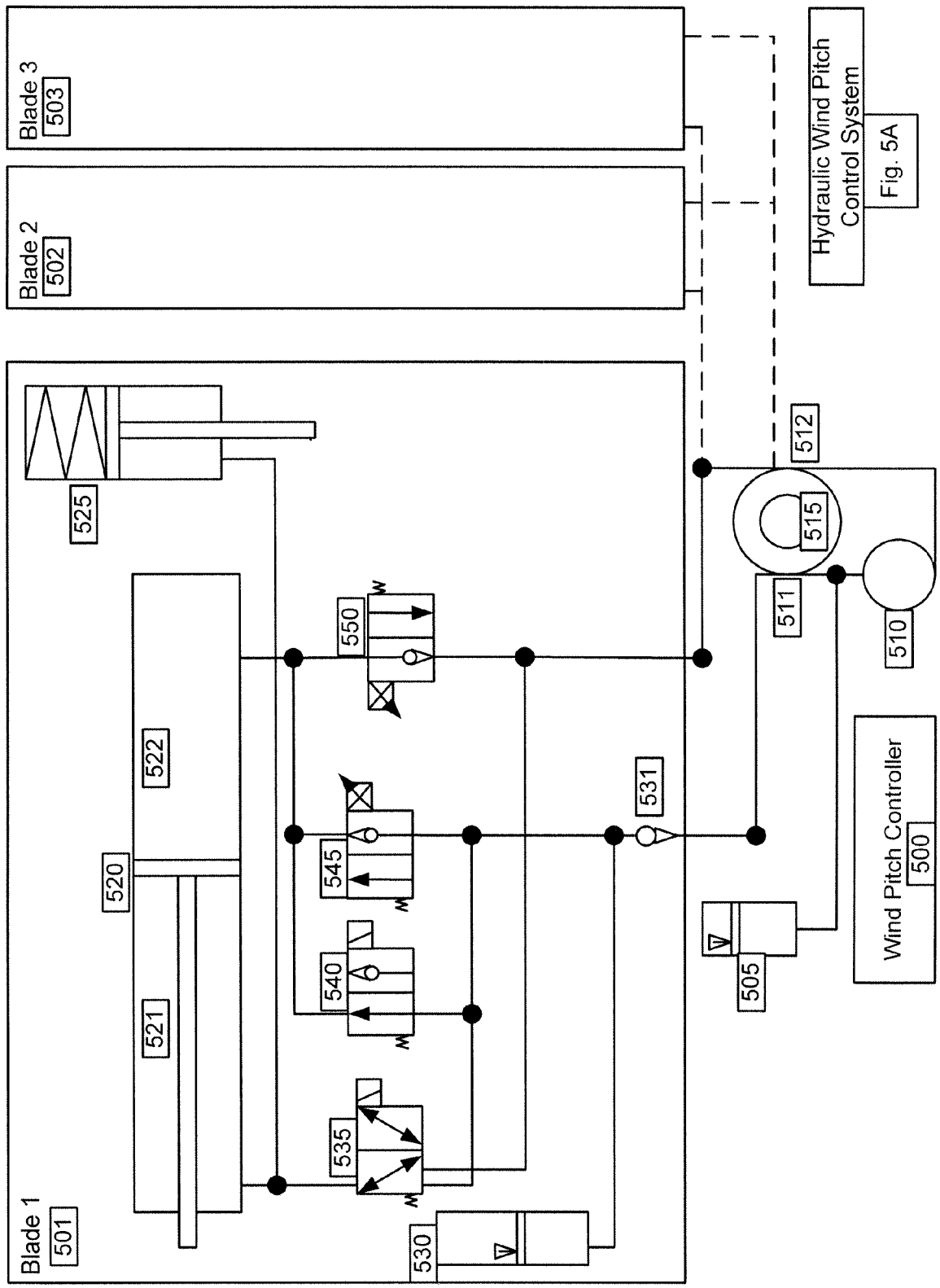

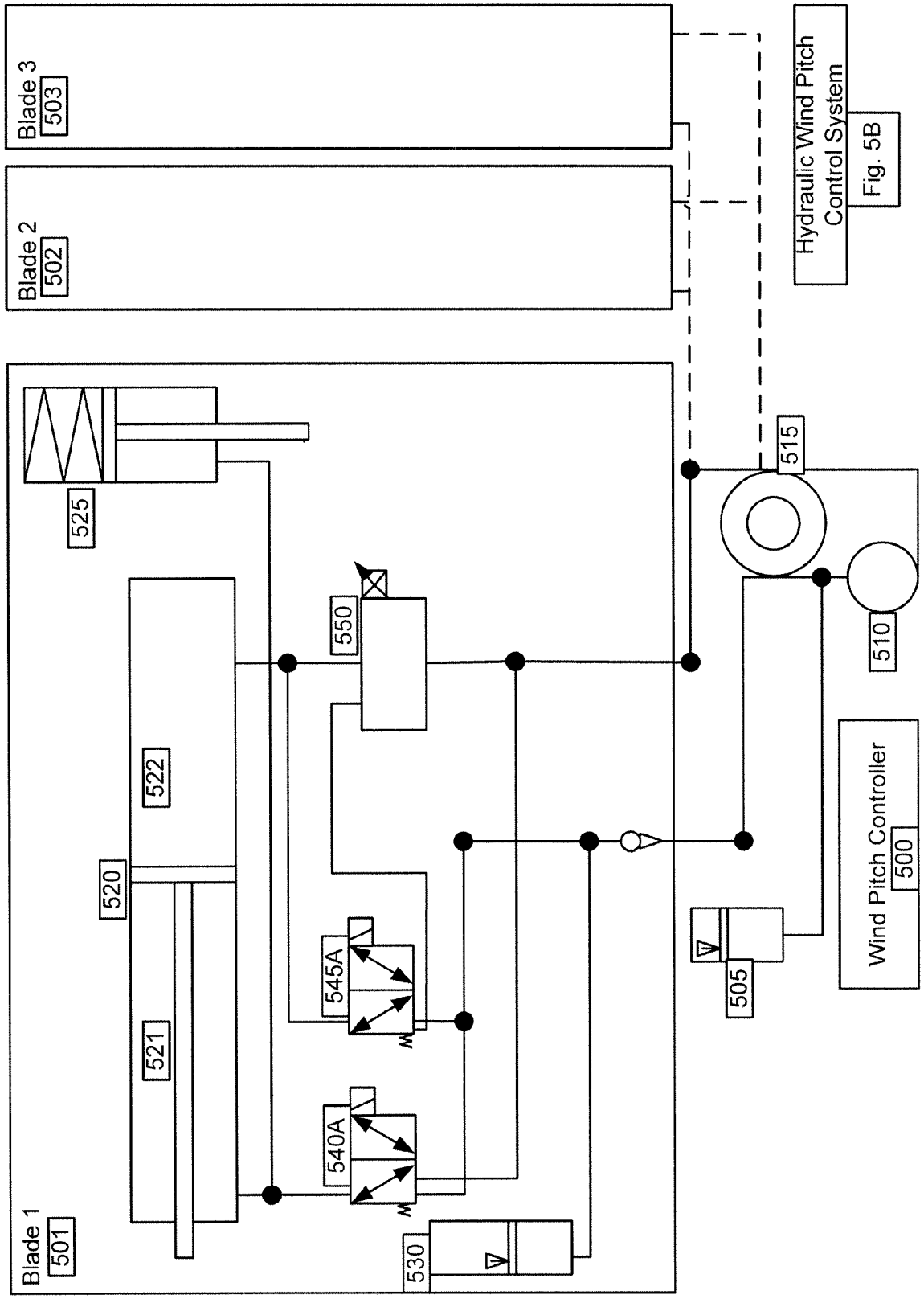

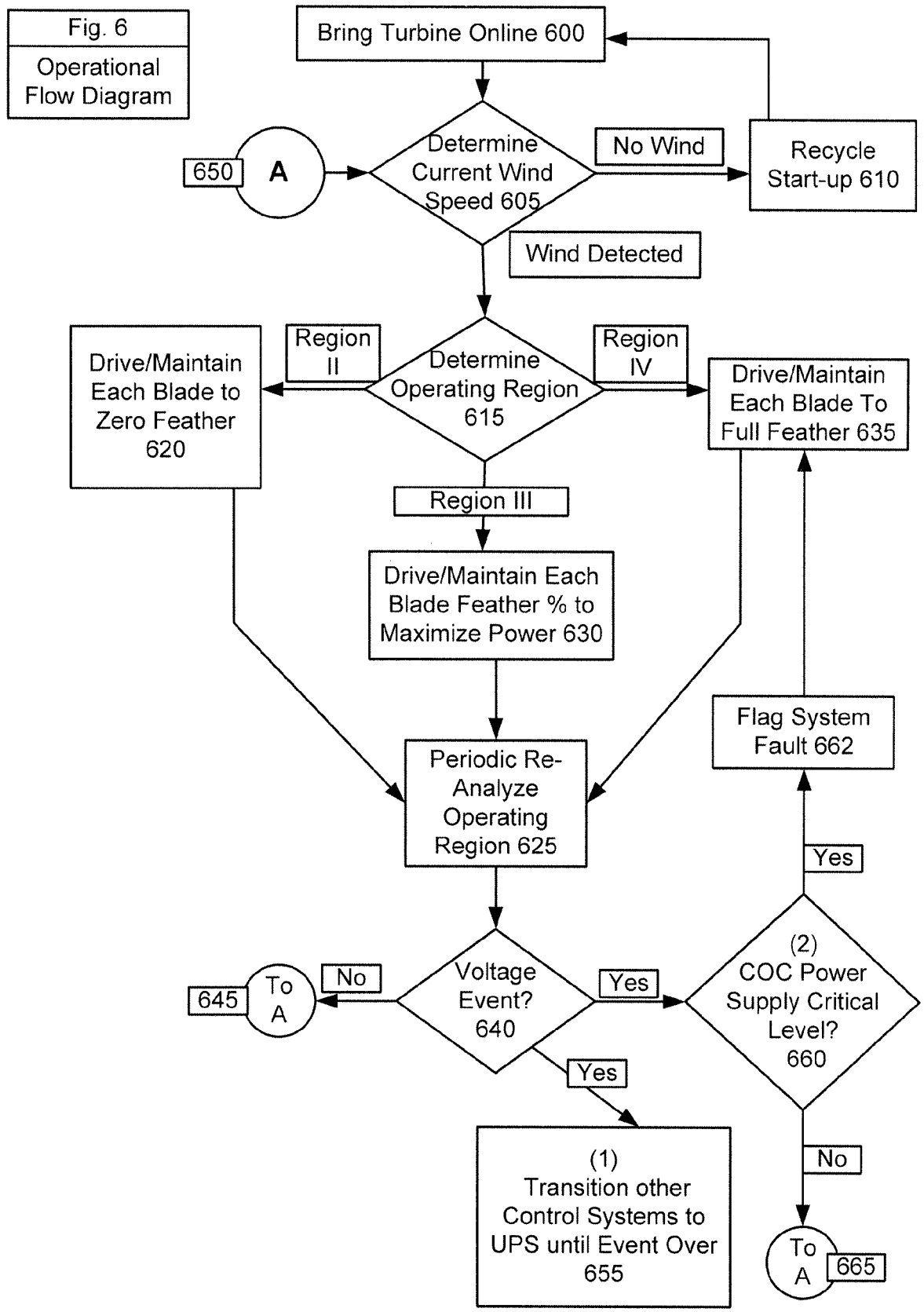

SYSTEMS, METHODS AND APPARATUSES FOR A WIND TURBINE CONTROLLER

PRIORITY CLAIMS AND RELATED APPLICATIONS

This disclosure claims priority to under 35 U.S.C. § 119 and incorporates by reference U.S. Provisional Patent Application titled "Systems and Methods for Pitch Control During Low Voltage Ride-Thru Event," filed Jul. 6, 2006, as Ser. No. 60/806,707.

FIELD

The present disclosure is generally directed to controlling a wind turbine, and more particularly, to apparatuses, methods and systems for maintaining consistent turbine operational characteristics during voltage irregularities.

BACKGROUND

As the use of wind turbines grows and the percentage of electricity wind turbines provide increases, solutions are necessary for controlling wind turbines during possible voltage irregularities (i.e., voltage events or fluctuations across a utility power grid). For example, Uninterruptible power supplies (UPS) have been incorporated into many wind tower assemblies in order to provide a backup power source. However, simply incorporating a UPS device does not provide a one-size-fits-all solution for a variety of reasons. For example, the UPS devices are not able to run all of the systems of a wind turbine, if the primary power supply is interrupted. As such, it may be necessary to operate certain systems at a reduced capacity when the UPS attempts to power all of the sub-systems. Furthermore, maintenance of the UPS device may necessitate additional service requirements for the turbine generator, resulting in difficulties associated with accessibility of the UPS device for service technicians. Accordingly, there is a need to implement a robust power solution—one which can maintain consistent turbine operating characteristics despite the possibility of voltages irregularities, as well as facilitate low maintenance costs. It is also important to ensure consistent operational turbine speeds before, during and after voltage irregularities, otherwise the turbine speed may increase during a voltage irregularities.

SUMMARY

The disclosure details implementations of apparatuses, methods, and systems for operating a wind turbine that may achieve consistent operational characteristics, despite the occurrence of voltages irregularities. This disclosure presents solutions that assist in expediting the adoption and incorporation of wind turbine generators. In an implementation, the system is configured to facilitate consistent operational control and address a variety of issues that may arise during the normal operation of a wind turbine connected with electrical power grid. For example, the disclosure discusses an implementation of the system, that is configured to maintain normal operation independent of repeated voltage events that may occur. In an implementation, the wind turbine control system is configured with a turbine controller that may transition certain ancillary turbine systems to a UPS device, while maintaining independent normal operational power characteristics for primary turbine systems (e.g., a wind turbine blade pitch control system).

BRIEF DESCRIPTION OF THE DRAWINGS

The accompanying appendices and/or drawings illustrate various non-limiting, representative, inventive aspects in accordance with the present disclosure:

FIGS. 3A-3B illustrate a diagram of turbine system components associated with a wind pitch control system according to implementations of the system;

FIG. 4 illustrates operational characteristics associated with a blade pitch control system according to an implementation of the system;

FIGS. 5A-5B illustrate diagrams of hydraulic elements associated with a wind pitch control system associated with implementations of the system;

FIG. 6 illustrates aspects of an operational flow diagram of a turbine control system according to an implementation of the system;

Figure 1:
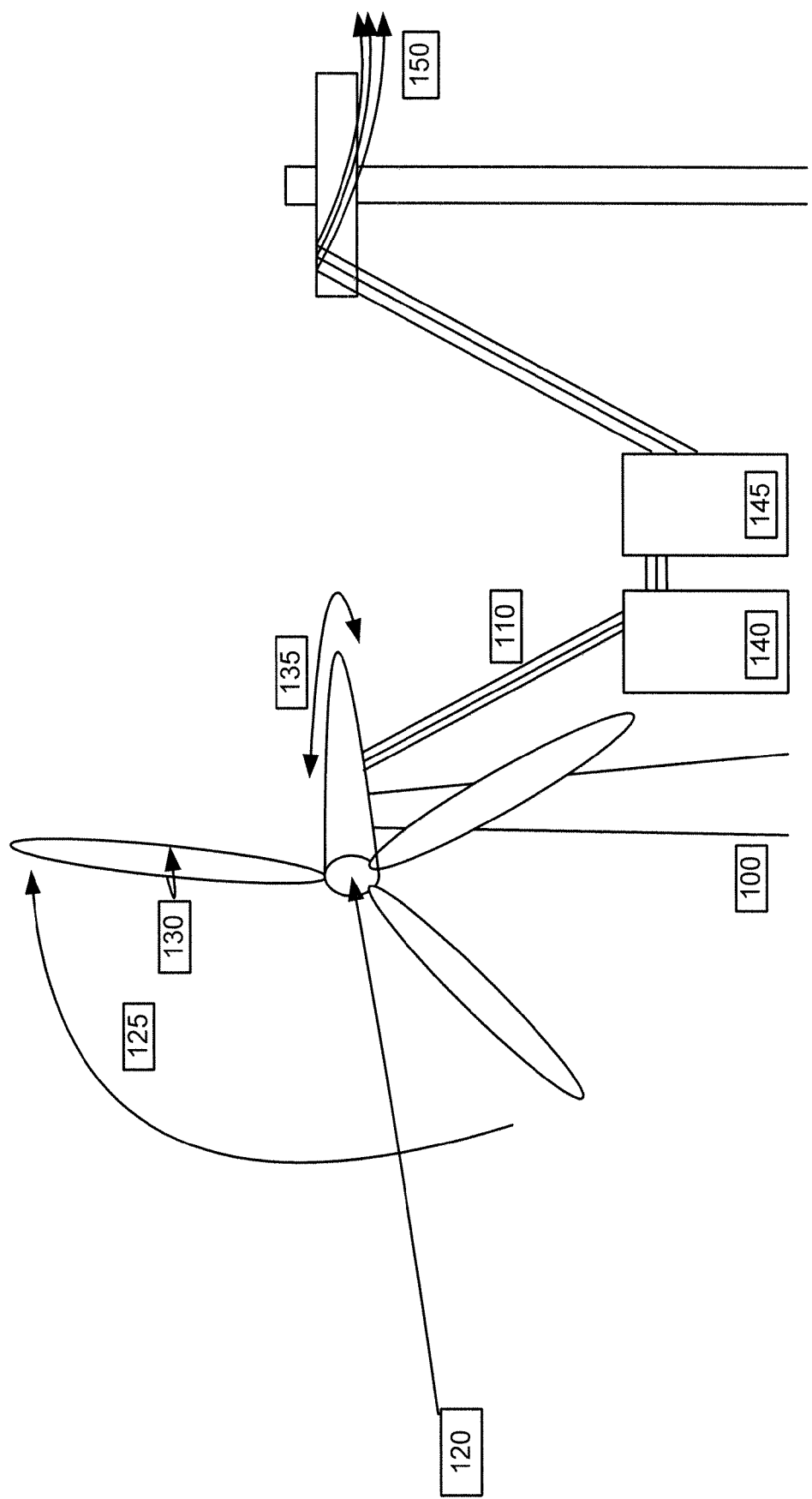
FIG. 1 is an overview of various wind turbine components.

The leading number of each reference numeral indicates the first drawing in which that reference numeral is introduced. For example, turbine 100 is first introduced in FIG. 1.

DETAILED DESCRIPTION

The disclosure details the implementation of apparatuses, methods, and systems for controlling a wind turbine generator.

FIG. 1 illustrates a variety of components associated with the control characteristics of a wind turbine generator. According to an implementation, a wind turbine generator 100 may be configured with a variety of sub-systems. These sub-systems may be controlled in coordination in order to improve the efficiency and quality of the power generated by turbine 100. For example, external sensors and/or systems such as a yaw control unit or a turbine blade pitch control system may be controlled in order to maximize the efficiency of generating power from a wind stream.

For example, in an implementation of the system the yaw control system may be manipulated based on feedback from a wind direction detector and configured to rotate the turbine rotor in the direction of arrow 135. In this implementation, the turbine rotor is able to achieve an optimal angle with regard to the direction of a wind stream 120. Feedback from the wind direction detector may be used to assist in controlling the pitch of the turbine blade 130 with regard to the direction or speed of wind stream 120. The turbine blade pitch control system may also utilize a sensor measurement of the rotor's revolutions per minute, in order to determine the tip speed of a turbine blade 125. Aspects of the blade pitch control system will be discussed in greater detail below.

Further efficiency gains may be realized by a turbine controller managing a power converter control system 140 that prepares the electricity generated by the turbine's generator for transfer to the turbine's transformer 145 and subsequently to a utility's power grid 150.

Depending on the particular implementation, the turbine controller, blade pitch controller or other system controllers may be implemented and configured in a variety of ways. The turbine controller (as well as the other subsystem controllers, for example a wind blade pitch controller) may serve to aggregate, execute, generate, identify, instruct, match, process, search, store, select serve, and/or facilitate interactions with a computer through for managing and coordinating various aspects of the functionality associated with operating a wind turbine, some of which is described in greater detail below.

Typically, users, which may be people and/or other systems, engage information technology systems (e.g., commonly computers or microcontrollers) to facilitate information processing. In turn, computers employ processors and other system components to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations.

These stored instruction code signals may engage the CPU circuit components to perform desired operations. A common type of program is a computer operating system, which, commonly, is executed by CPU on a computer or microcontroller; the operating system enables and facilitates users to access and operate computer information technology and resources. Common resources employed in information technology systems include: input and output mechanisms through which data may pass into and out of a computer; memory storage into which data may be saved; and processors by which information may be processed. In some implementations, the information technology systems may include interfaces for facilitating communication between the microcontroller with a variety of sensors or sub-systems. Often information technology systems are used to collect data for later retrieval, analysis, and manipulation, commonly, which may be facilitated through a database program. Information technology systems may provide similar interfaces that allow users to access and operate various system components.

In one embodiment, the turbine controller may be connected to and/or communicate with entities such as, but not limited to: one or more users from user input devices; peripheral devices; one or mores sensors; a variety of control systems; and/or a communications network.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, microcontroller, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The turbine controller may be based on common computer systems that may comprise, but are not limited to, components such as: a computer systemization connected to memory. A computer systemization may comprise a clock, central processing unit (CPU), a read only memory (ROM), a random access memory (RAM), and/or an interface bus, and most frequently, although not necessarily, are all interconnected and/or communicating through a system bus. Optionally, the computer systemization may be connected to an internal power source. Optionally, a cryptographic processor may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations or controllers, systems sensors, systems control sub-systems, peripheral devices, and/or the like. Of course, any of the above components may be connected directly to one another, connected to the CPU, and/or organized in numerous variations employed as exemplified by various computer systems.

The CPU comprises at least one processor or in some implementations a high-speed data processor adequate to execute program components for facilitating turbine control system functionality, executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the turbine controller, system primary and ancillary control systems, and beyond through various interfaces. Should processing requirements dictate a greater amount speed, parallel, mainframe and/or super-computer architectures may similarly be employed. Alternatively, should deployment requirements dictate greater portability or embedded control systems, smaller embedded microcontroller CPUs, and/or embedded control systems, may be employed.

Figure 2A:
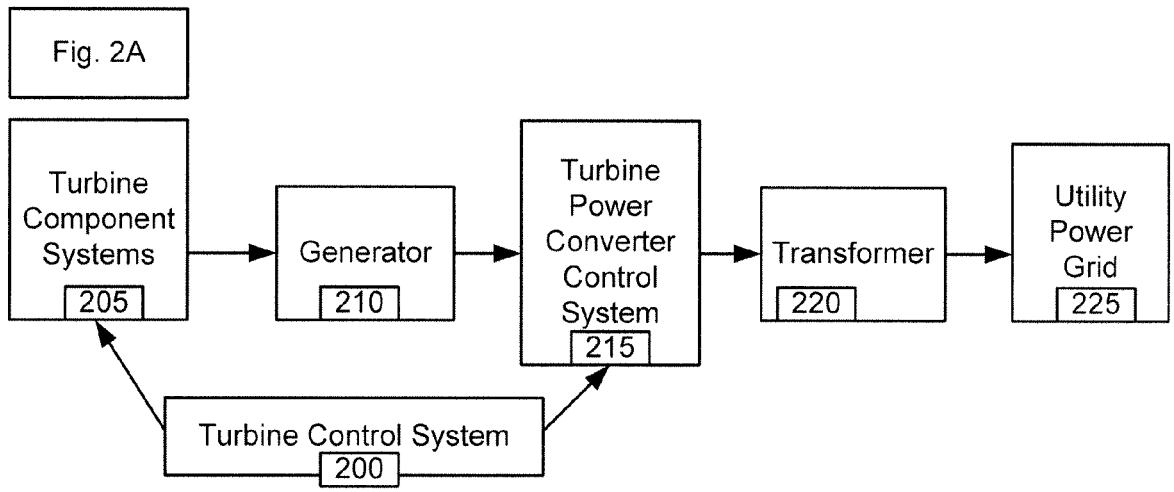
FIG. 2A is a diagram of turbine system components utilized during an energy transmission process.

FIG. 2A illustrates aspects of interaction between turbine components and the turbine control system and turbine controller 200 that includes turbine controller during the electricity generation/power transmission process. Turbine blades/rotor are communicatively connected with a gearbox (turbine component power generation systems 205), which in turn drives a generator 210. Depending on the operating parameters of a particular implementation, it is to be understood that a variety of generators may be used as part of the transmission system (e.g., induction/synchronous generators). In some implementations involving multiple wind turbines (or a wind farm), each turbine generator is connected with its own transformer 220 for stepping up the voltage characteristics from the generator for transmission to the utility grid 225.

Figure 2B:
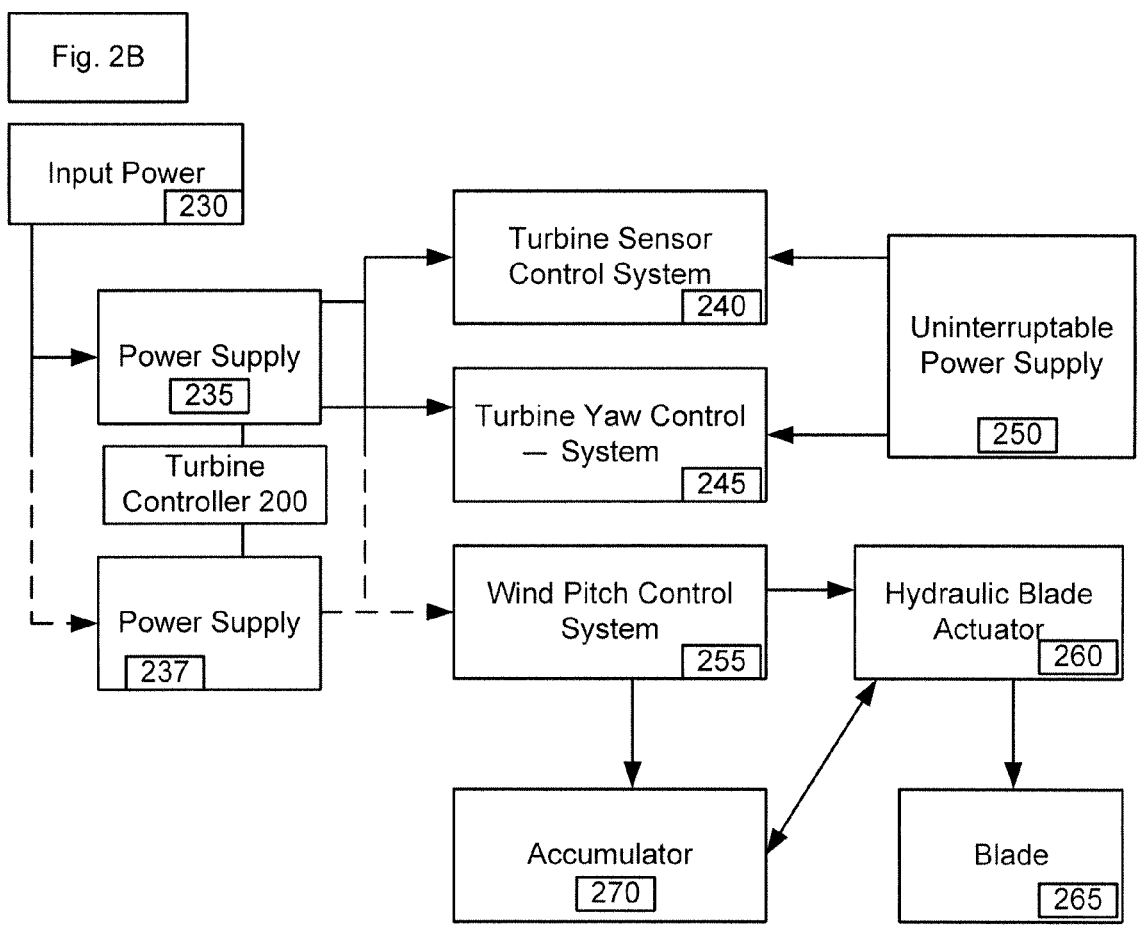
FIG. 2B illustrates a turbine component system interconnection diagram.

FIG. 2B illustrates aspects of the turbine control system 200 (in FIG. 2A). Power for the turbine control system and turbine controller 200 may be provided from input power sources 230 as input for a power supply 235. The power supply may be connected with primary turbine systems, such as wind pitch control system 255. Further, the power supply 235 may also be connected with ancillary turbine systems such as a turbine yaw control system 245 or various turbine sensor control systems 240. Depending on the implementation, the turbine sensor control systems may include a thermostat control sub-system, an anemometer sub-system and a vibration sensor system, a hydraulic fluid level control sub-system, and/or any number of other turbine sub-systems. As illustrated in FIG. 2B, these ancillary systems are connected with an uninterruptable power supply (UPS) 250. However, it is noted that the primary turbine systems, for example, a wind pitch control system 255 is connected only with the power supply. It is critical that these primary turbine systems are consistently driven when transitioning to a UPS at normal operating characteristics despite voltage irregularities that may occur.

According to one implementation, during a voltage irregularity the power supply 235 may lose its input power source. The ancillary sensor systems would be transferred to the UPS device and may be selectively operated at some sort of reduced capacity during a voltage irregularity (e.g., a voltage event). This would effectively lower the load demands on the UPS during the voltage irregularity. However, with regard to the primary control systems such as the wind pitch control system, it is critical to maintain continuous operating characteristics independent of whether a power supply temporarily loses its underlying power source without transitioning to a UPS device. Therefore, the wind pitch control system 255, as well as corresponding components including a hydraulic blade pitch drive device 260, and an accumulator 275, are driven solely by power supply 235 during normal operation and in the presence of voltage irregularities.

In some implementations, the primary turbine systems may be isolated and driven by another power supply 237 (connected with turbine controller 200). Power supply 235 and UPS 250 may drive ancillary systems and are not connected to primary turbine systems in this alternate implementation. Accordingly, power supply 237 would be solely responsible for providing power to the primary turbine systems like the wind pitch control system 255. This alternate implementation is illustrated by the dashed lines in FIG. 2B.

An embodiment of the power supply for providing power for primary turbine systems is illustrated in FIGS. 3A-3B. In FIG. 3A, a blade wind pitch controller is provided where raw auxiliary input power 300 is available during normal operation of the turbine to provide power to the primary turbine systems, such as blade pitch control system 310 and other primary turbine systems loads 320 through a power supply 315. As shown, the blade pitch controller 310 drives a proportional hydraulic valve 318 in order to adjust the turbine blade pitch. In this configuration, power for the primary turbine systems 320 is supplied from the power supply 315 under normal operation (as well as during the possible occurrence of a voltage event). During such an event, where the power 300 is absent, the power supply 315 continues to provide the necessary power for continued operation of the blade pitch controller 310 and the proportional hydraulic valve 318. This may be achieved by designing the power supply 315 to include a particular amount and type of energy storage device in the DC link of the power supply 315. Depending on the particular needs of the particular implementation, the energy storage device may be configured as a DC battery or large capacity capacitor.

One of the principal advantages of this approach to continued supply of power during voltage irregularities involves storing energy in an electrostatic field, for example in a capacitor rather than in electrochemical system. For this reason, a very large number of charge/discharge cycles are viable—minimizing service requirements for the turbine system and reducing system component replacement costs. This is not true for a turbine system that uniformly transitions turbine systems to a UPS device upon detection of a voltage event. FIG. 3B illustrates a circuit diagram according to an example implementation of the power supply. A determination of various circuit components associated with the power supply to achieve these operational characteristics is included below.

Assuming the voltage is essentially constant over the utility disturbance of 3 sec., a constant current draw by the hydraulic proportional valve of 83 mA is assumed.

$$Vc(0) - Vc(3 \text{ sec}) = \int_0^3 Ic, (t)dt,$$

$$0.2 \text{ V} = (83 \text{ mA})(3 \text{ sec}),$$

$$C = (83 \text{ mA})(3 \text{ sec})/0.2 \text{ V} \quad 1.245 \text{ Farads} \sim 1.25 \text{ Farads}$$

Accordingly, in an implementation of the system rated to maintain consistent operational characteristics beyond a 3 second voltage event, a 1.25 Farad, 6.3 or 10 V capacitor should be included as a component of the power supply. In an implementation this could be achieved through two aluminum electrolytics or one or more super-capacitors.

FIG. 4 illustrates aspects of the operational characteristics associated with four operating regions for turbine blade pitch control (425-440). The four graphs show different turbine control characteristics associated with the generator (rotor) speed 405, torque 410, power 415, and pitch angle 420, respectively. Each graph relates these characteristics 405-420 with an increasing wind speed 465. As will be described in greater detail below, regions II and III are power transfer operational regions, with the cusp 470 between the two regions acting as an optimal power transmission 'sweet spot.'

As illustrated in FIG. 4, in operating region I, the wind speed is below a cut-in threshold and as such, the turbine does not operate. As the wind speed increases and enters region II, the turbine rotor rotation speed varies in direct proportion to the wind speed. This maintains a constant, optimal blade tip speed ratio (TSR) for the turbine's rotor, which in turn optimizes energy capture in operating region II. The turbine controller also varies torque as the square of the wind speed and rotor rotational speed. Power is calculated as the product of torque and speed. Illustrated in graph 415, the generated power varies as the cube of wind speed (or rotor rotational speed). In region II, the wind pitch control system drives/maintains the turbine blades in a zero degree pitch (full power pitch position). That is, the blades are disposed to transfer the full power of the wind stream, which is generally at or about zero degrees.

The cusp 470 between regions II 430 and III 435 marks the transition point where the turbine achieves its rated power output. Operation in region III 435 requires the turbine to operate at a constant rotor rotation speed 475 and at a constant torque 476, despite any increases in the wind speed. The constant speed and torque operating characteristics are achieved by the turbine controller interacting with a primary turbine control system—the wind pitch control system. More specifically, as the speed of the wind increases, the pitch angle of the turbine blade is adjusted moving toward a full feather position (a ninety degree position that does not transfer any power).

Operating region IV 440 is considered a high wind speed cut-out region. Operating the turbine in this region is dangerous and damage to the turbine may occur. Accordingly, if the wind speed is determined to reach these levels, the turbine may be taken off-line.

Depending on the actual system configuration, the pitch control drive mechanism may be configured with electromechanical devices or as illustrated in FIG. 5A or 5B—hydraulic drive devices. By way of non-limiting example only, FIG. 5A illustrates aspects of a hydraulic turbine blade pitch drive system that interfaces with the wind blade pitch controller. FIG. 5A illustrates an implementation of a hydraulic blade pitch control sub-system for a single blade 501. Although not illustrated, it is to be understood that corresponding hydraulic blade pitch control sub-systems are also implemented for turbine blade 2 (502 in FIG. 5A), as well as blade 3 (503 in FIG. 5A). The hydraulic system stores energy in a hydraulic energy storing unit 505 on the nacelle that is communitively coupled with hydraulic pump 510 and configured to provide hydraulic energy for each blade's hydraulic blade pitch drive system on blades 501, 502 and 503.

The hydraulic energy is distributed through a rotating junction 515. In the implementation illustrated in FIG. 5A, the junction 515 is situated between the hydraulic circuit disposed in the nacelle and each hydraulic circuit situated in the hub. The rotating junction effectively provides/withdraws hydraulic energy through the pressure line 511 (illustrated on the left side of the junction) and a returning line 512 (illustrated on the right side of the junction). The hydraulic fluid provided by the junction 515 is supplemented by a hydraulic energy storage unit 530 associated with the blade circuit 501. A non-returning valve 531 is also incorporated into each hydraulic blade circuit in order to ensure the independence of each blade circuit.

Each blade circuit includes a hydraulic cylinder 520 that is manipulated in order to drive the blade between the full feather position (i.e., operating at ninety degrees, wherein the blade is configured to shed all power and not transmit any power from the wind stream) and a zero feather position (i.e., operating at zero degrees, wherein the blade fully transmits all power imparted from the wind stream). During normal operation, the front chamber 521 maintains a constant pressure and is connected with the pressure line, whereas the rear chamber 522 has a variable pressure in order to actuate the cylinder and thereby adjust the blade pitch.

During normal operation proportional valves 545 and 550 vary the pressure in the rear chamber 522, in order to actuate the cylinder 520. For example, in order to extend cylinder 520 valve 545 is activated to connect the rear chamber 522 with the pressure line (and thereby increase the pressure in the rear chamber). In contrast, to retract the cylinder, valve 550 is activated to connect the rear chamber with the return line (and thereby decrease the pressure inside the rear chamber 522).

In the implementation illustrated in FIG. 5A, emergency valves 535 and 540 are generally operated in an activated configuration, whereby the front chamber 521 is connected to the pressure line across 535 and the rear chamber 522 is disconnected across valve 540. If a system fault flag is generated, the wind pitch control system initiates the release of emergency valves 535 and 540, which results in the front chamber 521 being connected to the returning line across valve 535 and the rear chamber 522 connected to the pressure line across valve 540. Through this operational configuration, it is ensured that the cylinder 520 will extend in an emergency situation and force the blades to quickly transition to the full feather position.

An additional emergency safety measure included in some implementations of the system involves a blocking mechanism 525. When pressure is applied to the front chamber 521, the blocking mechanism is held retracted in an inactive position. However, if a system fault flag is generated by the turbine control system, the wind pitch control system reduces the front chamber pressure. In turn, a resort (spring) that normally retains the blocking cylinder, actuates the cylinder locking the blades into position once transitioned to full feather position. Advantageously, the blade is blocked and secured in the full feathered position. Otherwise, the blades may be moved by the wind (especially in the event that the wind directions shifts to come from behind the nacelle).

FIG. 5B illustrates an alternate implementation of the hydraulic turbine blade pitch drive system. Instead of implementing valves 545 and 550 as separate valves, the functionality is achieved by implementing a single proportional valve 545A, communicatively coupled with emergency valve 540A. Depending on the implementation, block 545A could be configured as a single valve block or comprising two separate valves. In this implementation, normal operation involves activating valve 545A, which thereby connects the line from proportional valve to rear chamber. In the event of a turbine controller-issued system fault flag, the emergency operation is based on connecting the pressure line to the rear chamber in order to force the cylinder to extend and transition the blade into a full feather position.

FIG. 6 illustrates aspects of an operational flow diagram associated with the turbine control system according to an implementation of the system. As the turbine is brought online 600, the turbine control system queries 605 the anemometer to determine the current wind speed in order to determine which operating region the turbine should transition to 615. If there is no wind the turbine controller recycles the start-up process 610 and transitions back to 600. In contrast, if wind is detected, the turbine controller transitions to determining which operational region will provide efficient and effective power transfer 615. The various operating regions are discussed above with regard to FIG. 4.

In the event that the turbine is already operating in one of the operational regions (650), the turbine control system will determine whether it is necessary to remain in the same operating region or transition to one of the other operating regions 615. If the turbine controller determines that it is necessary to operate in region II, the controller sends a message to the wind blade pitch control system to indicate that the pitch of each of the turbine's blades should be driven to/maintained in a zero feather position 620 (i.e., a zero degree pitch). If the turbine controller determines that it is necessary to operate in region III, the wind speed is used to determine an optimal percentage pitch for the blade. A message is then transmitted to the wind blade pitch controller that will in turn drive/maintain the blade to/in an optimal pitch percentage for the corresponding wind speed. In the event that the turbine controller determines it is necessary to operate in region IV, a message is transmitted to the wind blade pitch controller to indicate that the blades should be driven to/maintained in a full feather position 635 (i.e., ninety degree pitch).

The process of determining the optimal operating region and transitioning to or maintaining the blades in the optimal region is executed periodically. The actual periodic assessment may be executed over a range of periodic frequencies based on a variety of operational characteristics. For example, one implementation of the system may be based on a 20 hz periodic region determination 625. As part of the transition back to the start of the operating region assessment process 625, the turbine controller determines whether there are any voltage irregularities 640 (e.g., a voltage event).

If there is no voltage event detected, the turbine controller returns to point A 650. If a voltage event is detected, the turbine controller may (1) transition ancillary turbine systems (e.g., some turbine sensor systems) to an uninterruptible power supply 655. The turbine controller also (2) checks the supply voltage level of the power supply configured to supply the turbine's primary systems 660 (e.g., the wind blade pitch control system). If the power supply has discharged and reaches a critical level, the turbine controller generates a system fault flag 662 and drives the blades to a full feather position 635 (e.g. examples of the emergency fault drive system are described above with regard to FIGS. 5A-5B). If the power supply has not approached a critical level 665, despite any detected voltage irregularities, the turbine controller cycles back to A 650 and re-assesses the current operating characteristics. Effectively, despite voltage irregularities, the turbine primary systems are driven under normal operating conditions without being transitioned to and/or powered by a UPS device. However, it is noted that in some implementations, the ancillary turbine systems may operate at a reduced capacity to lower the draining effect on a UPS device.

Figure 7:
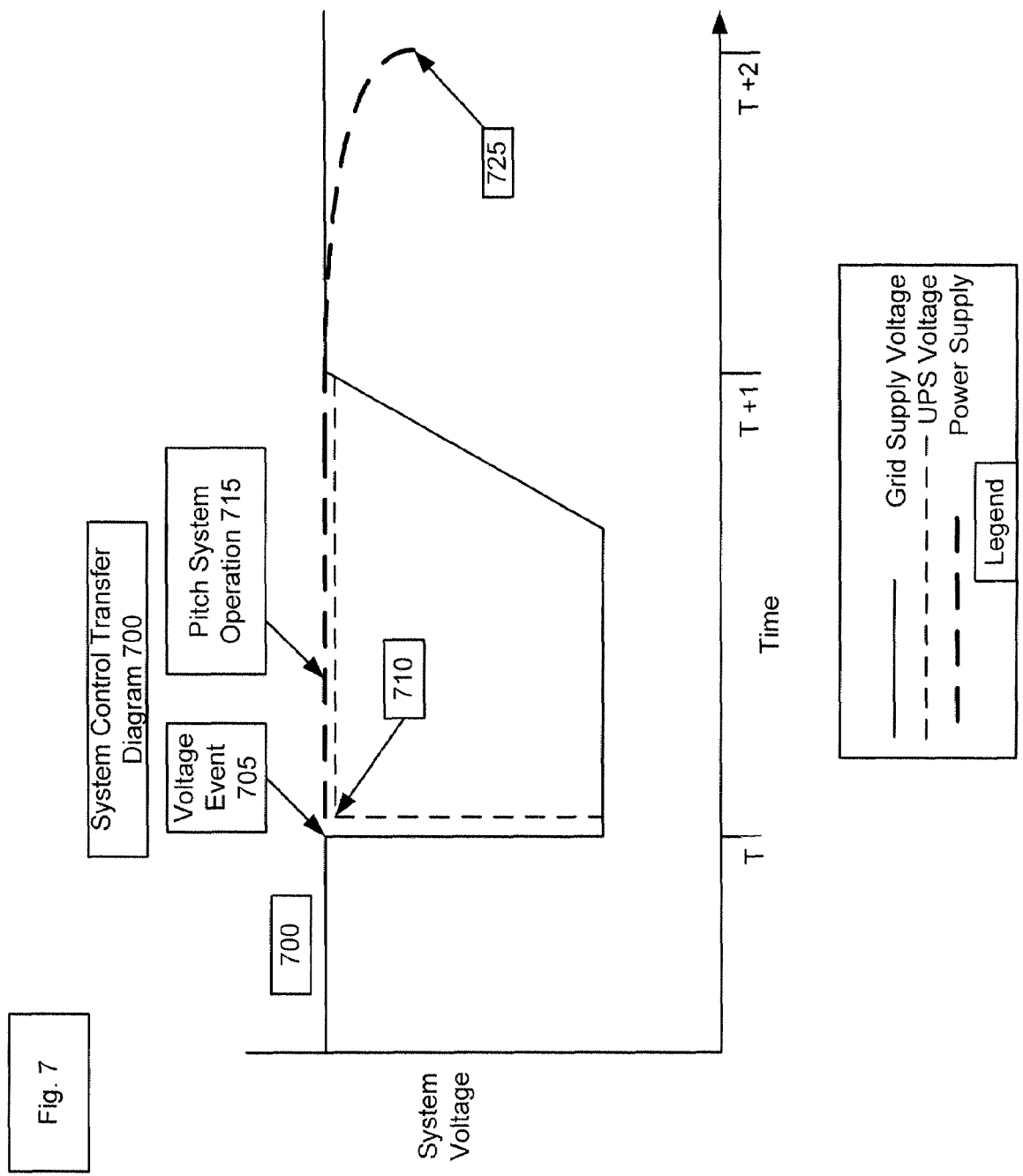
FIG. 7 is a graph illustrating aspects of operational voltage characteristics with a turbine control system according to an implementation.

FIG. 7 illustrates aspects of the turbine system coordinated by the turbine controller. In FIG. 7, the system operates at an ordinary system voltage 700 until time T. At time T, the system detects a voltage event 705, wherein the input voltage drops significantly. At this time the turbine controller may be configured to transition ancillary turbine systems to the UPS device (shown by the dashed line 710). As discussed above, in some implementations, the system may then enter a reduced capacity operational state in order to lower the loading demand on the UPS. Also, as the ancillary systems are transitioned to the UPS device, the system still expends additional resources and may encounter a brief delay in data processing.

In contrast, despite the drop in the input supply voltage 700, the turbine controller operates the primary turbine systems under normal operational characteristics (bold dashed line 715). For example, the power supply connected to the wind blade pitch control system does not transition to either the UPS or enter a reduced operating capacity state. Instead, (as illustrated by the bold dashed line 715), the pitch system is provided with ordinary operating characteristics by the power supply. In the implementation discussed in FIG. 3B, this may be achieved by storing energy in capacitors within the power supply and then discharging to maintain ordinary voltage characteristics 715.

As illustrated, there is a point in time T+2 when the power supply will no longer be able to sustain these operational levels. However, based on the parameters of the power supply, it may be possible to ensure that the time T+2 is significantly larger than the expected duration of any voltage irregularities.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A wind turbine generator system comprising:

a power supply operatively coupled to primary and ancillary turbine systems;

an uninterruptible power supply device operatively coupled to ancillary turbine systems;

a nacelle supporting one or more turbine blades and having a turbine blade pitch controller controlling a hydraulic turbine pitch drive circuit for each of the turbine blades and configured to actuate the blade between a zero feather position and a full feather position;

a turbine controller configured to control ancillary turbine systems that are driven by the power supply during ordinary operation and in coordination with the uninterruptible power supply during a voltage irregularity;

the turbine controller is also configured to control primary turbine systems including a turbine blade pitch control system, wherein the turbine controller maintains consistent operating characteristics through the power supply powering the primary turbine systems independent of the uninterruptible power supply device during both normal operation and voltage irregularities.

2. The system of claim 1, further comprising:
driving all of the turbine blades into a full feather position upon detection of a critical level of the power supply responsible for powering primary turbine control systems.

3. The system of claim 2, further comprising:
issuing a system fault flag if the turbine controller detects a critical level in the power supply responsible for the primary turbine control systems.

4. The system of claim 3, wherein the turbine controller requires a manual override to transition back to ordinary operating characteristics after issuing the system fault flag.

5. The system of claim 2, wherein each of the one or more turbine blades have an independent hydraulic blade pitch actuation servo motor.

6. The system of claim 2, wherein each of the independent hydraulic circuits are communitively coupled with a hydraulic cylinder and configured to drive the hydraulic cylinder that changes the pitch of each turbine blade between a zero feather and a full feather position.

7. The system of claim 3, further comprising:
the turbine blade pitch controller is operatively connected with a hydraulic pitch drive circuit configured for driving each turbine blade with emergency actuation valves.

8. The system of claim 7, wherein each turbine blade includes a blocking mechanism that is configured to lock the blades in a full feather position after a system fault flag has been generated.

9. The system of claim 8, wherein each blade hydraulic pitch drive circuit is configured to be driven independently by the turbine blade pitch controller.

10. A wind turbine generator comprising:
a blade pitch control system configured to vary a pitch associated with one or more turbine blades;
a power supply coupled to the blade pitch control system, wherein the power supply is configured to provide power to the blade pitch control system during a low voltage event without transfer to an uninterruptible power supply; and
an uninterruptible power supply configured to provide power to non-pitch control turbine components during a low voltage event.

11. The wind turbine generator of claim 10, wherein the blade pitch control system further comprises an independent hydraulic blade actuation system for each of the one or more turbine blades.

12. The wind turbine generator of claim 11, wherein the power supply further comprises an additional energy storage component configured to drive each independent hydraulic blade actuation system during both normal operation and during a low voltage event.

13. The wind turbine generator of claim 12, wherein the voltage output level of the power supply is monitored.

14. The wind turbine generator of claim 13, wherein a system fault flag is issued if the power supply reaches a critical operating voltage level.

15. The wind turbine generator of claim 14, wherein each turbine blade further includes a blade blocking mechanism that is configured to lock the blades into a full feather position after a system fault flag has been issued.

* * * * *